United States Patent [19]
Seeger et al.

[11] 3,857,958
[45] Dec. 31, 1974

[54] ANTIPHLOGISTIC PHARMACEUTICAL COMPOSITIONS CONTAINING 4-(4-BIPHENYLYL)-1-BUTANOL AND METHOD OF USE

[75] Inventors: Ernst Seeger; Wolfhard Engel; Helmut Teugel; Gunther Engelhardt, all of Biberach-Riss, Germany

[73] Assignee: Boehringer Ingelheim GmbH, Ingelheim am Rhein, Germany

[22] Filed: Jan. 17, 1974

[21] Appl. No.: 434,041

Related U.S. Application Data

[62] Division of Ser. No. 294,940, Oct. 4, 1972, Pat. No. 3,801,654.

[30] Foreign Application Priority Data
Oct. 15, 1971 Germany............................ 2151312

[52] U.S. Cl. ............................................... 424/343
[51] Int. Cl............................................. A61k 27/00
[58] Field of Search .................................... 424/343

[56] References Cited
OTHER PUBLICATIONS

Dice et al., J. Am. Chem., Soc. 72, pp. 1738–40 (1950).

Huber et al., J. Am. Chem. Soc. 68, pp. 1709–12 (1946).

Primary Examiner—Stanley J. Friedman
Attorney, Agent, or Firm—Hammond & Littell

[57] ABSTRACT

Antiphologistic pharmaceutical compositions containing 4-(4'-biphenylyl)-1-butanol as the active ingredient, and a method of using the same as an antiinflammatory agent.

2 Claims, No Drawings

ANTIPHLOGISTIC PHARMACEUTICAL COMPOSITIONS CONTAINING 4-(4-BIPHENYLYL)-1-BUTANOL AND METHOD OF USE

This a division of copending application Ser. No. 294,940, filed Oct. 4, 1972, now U.S. Pat. No. 3,801,654.

This invention relates to novel antiphlogistic pharmaceutical compositions containing 4-(4'-biphenylyl)-1-butanol as the active ingredient, as well as to a method of using the same as an anti-inflammatory agent.

More particularly, the present invention relates to pharmaceutical dosage unit compositions containing as the active ingredient the compound of the formula

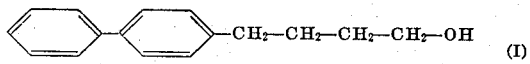
(I)

This compound may be prepared by reducing 4-(4'-biphenylyl)-butyric acid of the formula.

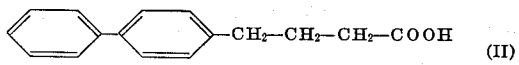
(II)

with a complex hydride, preferably with lithium aluminum hydride, in the presence of a solvent medium, such as tetrahydrofuran, ether, dioxane, dimethoxy-ethane, diethyleneglycol dimethyl ether, benzene or mixtures of any two or more of these, preferably at room temperature or at a temperature up to the boiling point of the particular solvent medium which is used.

The starting compound, (4-(4'-biphenylyl)-butyric acid, is a known compound and may itself be prepared, for instance by catalytic hydrogenation of 4-(4'-biphenylyl)-4-oxo-butyric acid in a polar solvent, such as glacial acetic acid, in the presence of a strong acid, such as perchloric acid, at a temperature between 0° and 50°C and a hydrogen pressure of 1 to 5 atmospheres with palladized barium sulfate or palladized charcoal as the catalyst (cf. also German Offenlegungsschrift 2,112,840). 4-(4'-biphenylyl)-4-oxo-butyric acid, in turn, may be obtained by reacting biphenyl with succinic acid anhydride in the presence of a Lewis acid, such as anhydrous aluminum chloride, in a solvent medium, such as nitrobenzene or methylene chloride, at a temperature between 0° and 80°C.

The following example illustrates the preparation of 4-(4'-biphenylyl)-1-butanol.

EXAMPLE 1

1.13 gm (0.03 mol) of lithium aluminum hydride were gradually added to a solution of 7.21 gm (0.03 mol) of 4-(4'-biphenylyl)-butyric acid (m.p. 118°–119°C) in 100 ml of absolute tetrahydrofuran, accompanied by stirring, and the resulting mixture was refluxed for four hours. Thereafter, the reaction mixture was allowed to cool and was then poured into ice water, the aqueous mixture was acidified with aqueous 50 percent sulfuric acid, and the acidic mixture was extracted with ether. The ethereal extract solution was washed with aqueous sodium bicarbonate and water, dried and freed from solvent by evaporation. The residue was distilled in vacuo, yielding 6.1 gm (90% of theory) of 4-(4'-biphenylyl)-1-butanol with a boiling point of 147-148°C at 0.1 mm Hg which, after crystallization from petroleum ether, had a melting point of 75°–76°C.

4-(4'-Biphenylyl)-1-butanol has useful pharmacodynamic properties. More particularly, it exhibits very effective antiphlogistic activity in warm-blooded animals, such as rats.

The compound was tested for its anti-exudative effects on the kaolin edems and carrageenin edema of the hind paws of the rat, for its ulcerogenicity and for its acute toxicity by oral administration to rats in comparison with phenylbutazone.

The kaolin edema was induced according to the method of Hillebrecht [Arzneimittel-Forsch. 4, 607 (1954)] by subplantary injection of 0.05 ml of a 10 percent suspension of kaolin in a 0.85% sodium chloride solution. The measurement of the thickness of the paws was done by using the technique of Doepfner and Cerletti (Int. Arch. Allergy. Immunol. 12, 89 (1958)).

Male FW 49-rats of an average weight of 120–150 gm were orally treated with the test compounds 30 minutes before inducement of the edema with the aid of an esophageal tube. Five hours after the provocation of the edema the averaged values of the swelling caused in the paws of the rats treated with the test compounds were compared with those values measured on blind-treated control animals. By graphic extrapolation the dose leading to a 35 percent reduction of the swelling ($ED_{35}$) was calculated from the present reduction values measured by administration of different doses.

The provocation of the carrageenin edema was effected according to the method of Winter et al. [Proc. Soc. exp. Biol. Med. 111, 544 (1962)] by subplantary injection of 0.05 ml of a 1 percent solution of carrageenin in a 0.85 percent solution of sodium chloride. The test compounds were orally administered 60 minutes before the provocation of the edema.

For the calculation of the reductive effect on the edema the values measured three hours after the provocation of the edema were used. All the other details were the same as described above in the case of the kaolin edema.

The tests for ulcerogenic activity were effected on FW 49-rats of both sexes (ratio 1:1) having a body weight of 130 to 150 gm. The animals were given the test substances on three subsequent days, once each day, as a trituration in tylose by way of an esophageal tube.

The animals were killed four hours after the last administration; the stomach and duodenal mucosa were investigated for ulcers.

From the percentage of animals showing ulcers after administration of different doses, the $ED_{50}$-value was calculated according to the method of Litchfield and Wilcoxon [J. Pharmacol. exp. Therap. 96, 99(1949)].

After oral administration to male and female FW 49-rats (ratio 1:1) having an average body weight of 135 gm, the acute toxicity ($LD_{50}$) was determined. The substances were administered orally as a trituration in tylose.

The calculation of the $LD_{50}$-values was effected, as far as possible, according to the method of Litchfield and Wilcoxon, based on the percentage of animals which died within 14 days after administration of the different doses.

The therapeutic indices, as a measure for the therapeutic usefulness, were calculated by forming the quotient of the $ED_{50}$-value for the ulcerogenicity or of the $LD_{50}$-value and the $ED_{35}$-value derived from the test for anti-exudative activity against the kaolin and carrageenin edema.

The compound of the present invention surpasses the known compound, phenylbutazone, in its antiphlogistic activity (see Table I). In comparison with phenylbutazone it possesses a lower toxicity and exerts a less impairing effect on the mucosa of the stomach.

The resulting substantially more favorable therapeutic indices (see Table II) point to a significantly better therapeutic usefulness as compared with phenylbutazone, which is known to be compatible with the stomach only on a very limited scale.

EXAMPLE 2

Tablets

The tablet composition is compounded from the following ingredients:

| | | |
|---|---:|---|
| 4-(4'-Biphenylyl)-1-butanol | 100.0 | parts |
| Corn starch | 97.0 | do. |
| Polyvinylpyrrolidone | 10.0 | do. |
| Magnesium stearate | 3.0 | do. |
| Total | 210.0 | parts |

Preparation

The butanol compound and the corn starch are intimately admixed with each other, the mixture is granulated with an aqueous 14% solution of the polyvinylpyrrolidone through a 1.5 mm-mesh screen, the granulate is dried at 45°C and again passed through the screen, the dry granulate is admixed with the magne-

TABLE I

| Compound | kaolin edema $ED_{35}$ per os mgm/kg | carrageenin edema $ED_{35}$ per os mgm/kg | acute toxicity in the rat $LD_{50}$ per os | | ulcerogenicity in the rat $ED_{50}$ per os | |
|---|---|---|---|---|---|---|
| | | | mgm/kg | confidence limits (95% probability) | mgm/kg | confidence limits (95% probability) |
| Phenylbutazone | 58 | 69 | 864 | 793 – 942 | 106 | 82 – 138 |
| 4-(4'-Biphenyl-yl)-1-butanol | 9.6 | 9.8 | 830 | 703 – 974 | 48.3 | 42.2 – 55.3 |

TABLE II

| Compound | antiexudative effect $ED_{35}$ mgm/kg*) | acute toxicity $LD_{50}$ mgm/kg | ulcerogenic effect $ED_{50}$ mgm/kg | therapeutic index | |
|---|---|---|---|---|---|
| | | | | ratio of toxic and antiexudative effect $LD_{50}/ED_{35}$ | ratio of ulcerogenic and antiexudative effect $ED_{50}/ED_{35}$ |
| Phenylbutazone | 63.5 | 864 | 106 | 13.6 | 1.7 |
| 4-(4'-Biphenyl-yl)-1-butanol | 9.7 | 830 | 48.3 | 85.5 | 4.99 |

*) arithmetically averaged value from $ED_{35}$ kaolin edema and $ED_{35}$ carraggenin edema For pharmaceutical purposes, 4-(4'-biphenylyl)-1-butanol is administered to warm-blooded animals perorally, parenterally or rectally as the active ingredient in customary dosage unit compositions, that is, compositions in dosage unit form consisting essentially of an inert pharmaceutical carrier and one effective dosage unit of the active ingredients, such as tablets, coated pills, capsules, wafers, powders, solutions, suspensions, emulsions, syrups, suppositories and the like. One effective antiphlogistic dosage unit of the compound according to the present invention is from 0.16 to 3.34 mgm/kg body weight, preferably 0.83 to 2.5 mgm/kg body weight. The daily dose rate is from 0.83 to 8.3 mgm/kg body weight, preferably 1.17 to 5.0 mgm/kg body weight.

The following examples illustrate a few pharmaceutical dosage unit compositions comprising 4-(4'-biphenylyl)-1-butanol as an active ingredient and represent the best modes contemplated of putting the invention into practical use. The parts are parts by weight unless otherwise specified.

sium stearate, and the composition is compressed into 210 mgm-tablets in a conventional tablet making machine. Each table contains 100 mgm of the butanol compound and is an oral dosage unit composition with effective antiphlogistic action.

EXAMPLE 3

Coated pills

The pill core composition is compounded from the following ingredients:

| | | |
|---|---:|---|
| 4-(4'-Biphenylyl)-1-butanol | 100.0 | parts |
| Corn starch | 70.0 | do. |
| Gelatin | 8.0 | do. |
| Talcum | 18.0 | do. |
| Magnesium stearate | 4.0 | do. |
| Total | 200.0 | parts |

Preparation

The butanol compound and the corn starch are intimately admixed with each other, the mixture is granulated with an aqueous 10 percent solution of the gelatin through a 1.5 mm-mesh screen, the granulate is dried at 45°C and again passed through the screen, the dry granulate is admixed with the talcum and the magnesium stearate, and the composition is compressed into 200 mgm-pill cores which are subsequently coated with a thin shell consisting essentially of a mixture of sugar and talcum and finally polished with beeswax. Each coated pill contains 100 mgm of the butanol compound and is an oral dosage unit composition with effective antiphlogistic action.

EXAMPLE 4

Gelatin capsules

The capsule filler composition is compounded from the following ingredients:

| | | |
|---|---|---|
| 4-(4'-Biphenylyl)-1-butanol | 100.0 | parts |
| Corn starch | 190.0 | do. |
| Colloidal silicic acid | 6.0 | do. |
| Magnesium stearate | 4.0 | do. |
| Total | 300.0 | parts |

Preparation

The ingredients are intimately admixed with each other, and 300 mgm-portions of the mixture are filled into No. 4 gelatin capsules. Each capsule contains 100 mgm of the butanol compound and is an oral dosage unit composition with effective antiphlogistic action.

EXAMPLE 5

Suppositories

The suppository composition is compounded from the following ingredients:

| | | |
|---|---|---|
| 4-(4'-Biphenylyl)-1-butanol | 200.0 | parts |
| Suppository base (e.g. cocoa butter) | 1450.0 | do. |
| Total | 1650.0 | parts |

Preparation

The finely pulverized butanol compound is blended with the aid of an immersion homogenizer into the suppository base which had previously been melted and cooled to 40°C. 1,650 mgm-portions of the composition are poured into cooled suppository molds and allowed to harden theein. Each suppository contains 200 mgm of the butanol compound and is a rectal dosage unit composition with effective antiphlogistic action.

EXAMPLE 6

Suspension

The suspension is compounded from the following ingredients:

| | | | |
|---|---|---|---|
| 4-(4'-Biphenylyl)-1-butanol | | 2.0 | parts |
| Dioctyl sodium sulfosuccinate (DONSS) | | 0.02 | do. |
| Benzoic acid | | 0.1 | do. |
| Sodium cyclamate | | 0.2 | do. |
| Colloidal silicic acid | | 1.0 | do. |
| Polyvinylpyrrolidone | | 0.1 | do. |
| Glycerin | | 25.0 | do. |
| Flavoring | | 0.1 | do. |
| Distilled water | q.s.ad. | 100.0 | do. by vol. |

Preparation

The DONSS, the benzoic acid, the sodium cyclamate and the polyvinylpyrrolidone are successively dissolved in a sufficient amount of distilled water at 70°C, and the glycerin and colloidal silicic acid are added to the solution. The mixture is cooled to room temperature, the finely pulverized butanol compound is suspended therein by means of an immersion homogenizer, the flavoring is added, and the composition is diluted with additional distilled water to the indicated volume. 5 ml of the resulting aqueous suspension contain 100 mgm of the butanol compound and are an oral dosage unit composition with effective antiphlogistic action.

Analogous results are obtained when the amount of active ingredient in illustrative Examples 2 to 6 is varied within the dosage unit range set forth above; likewise, the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An antiphlogistic pharmaceutical dosage unit composition consisting essentially of an inert pharmaceutical carrier and an effective antiphlogistic amount of 4-(4'-biphenylyl)-1-butanol.

2. The method of counteracting inflammation in a warm-blooded animal, which comprises perorally, parenterally or rectally administering to said animal an effective antiphlogistic amount of 4-(4'-biphenylyl)-1-butanol.

* * * * *